United States Patent
Satomaa et al.

(10) Patent No.: US 7,392,537 B2
(45) Date of Patent: Jun. 24, 2008

(54) MANAGING A NETWORK SECURITY APPLICATION

(75) Inventors: Jari Satomaa, Oulu (FI); Hannu Pudas, Oulu (FI); Mika Jalava, Siuntio (FI)

(73) Assignee: Stonesoft Oy, Helsinki (FI)

( * ) Notice: Subject to any disclaimer, the term of this patent is extended or adjusted under 35 U.S.C. 154(b) by 656 days.

(21) Appl. No.: 09/973,561

(22) Filed: Oct. 8, 2001

(65) Prior Publication Data
US 2003/0070084 A1   Apr. 10, 2003

(51) Int. Cl.
*G06F 15/177* (2006.01)
*G06F 17/00* (2006.01)

(52) U.S. Cl. .......................... 726/11; 709/220; 709/229
(58) Field of Classification Search ............... 713/201; 709/220–226; 726/12
See application file for complete search history.

(56) References Cited

U.S. PATENT DOCUMENTS

| | | | |
|---|---|---|---|
| 5,978,850 A * | 11/1999 | Ramachandran et al. | 709/228 |
| 6,047,322 A * | 4/2000 | Vaid et al. | 709/224 |
| 6,161,139 A | 12/2000 | Win et al. | 709/225 |
| 6,212,558 B1 * | 4/2001 | Antur et al. | 709/221 |
| 6,237,031 B1 * | 5/2001 | Knauerhase et al. | 709/221 |
| 6,253,211 B1 * | 6/2001 | Gillies et al. | 707/201 |
| 6,453,353 B1 * | 9/2002 | Win et al. | 709/229 |
| 6,496,927 B1 * | 12/2002 | McGrane et al. | 713/1 |
| 6,584,508 B1 * | 6/2003 | Epstein et al. | 709/229 |
| 6,640,097 B2 * | 10/2003 | Corrigan et al. | 455/414.1 |
| 6,678,826 B1 * | 1/2004 | Kelly et al. | 726/2 |
| 6,681,232 B1 * | 1/2004 | Sistanizadeh et al. | 707/104.1 |
| 6,766,165 B2 * | 7/2004 | Sharma et al. | 455/423 |
| 6,901,439 B1 * | 5/2005 | Bonasia et al. | 709/220 |
| 6,990,548 B1 * | 1/2006 | Kaylor | 710/305 |

OTHER PUBLICATIONS

Anonymous: "AltaVista Firewall 98. Software Product Description" Oct. 1998, whole document, Compaq Computer Corporation.
Roth, "Wireless Server Management," Windows 2000 Magazine, Sep. 2001.

* cited by examiner

*Primary Examiner*—Matthew Heneghan
(74) *Attorney, Agent, or Firm*—Ronald Craig Fish, A Law Corp.

(57) ABSTRACT

The invention provides an arrangement for managing a network security application comprising a full management user interface for conducting management operations for the network security application, and a limited management user interface for conducting a limited number of management operations of the full management user interface for the network security application over a wireless remote connection.

10 Claims, 4 Drawing Sheets

MANAGING A NETWORK SECURITY APPLICATION

BACKGROUND OF THE INVENTION

The invention relates in general to network security. In particular the invention relates to managing a network security application, such as a firewall, security gateway, Intrusion Detection System (IDS) or Virtual Private Network (VPN) gateway.

Public networks are presently being used more and more for sensitive and mission critical communications and the internal networks of various organisations and enterprises are nowadays connected to the public networks, Internet being one of them. Since the basic mechanisms of the public networks were originally not designed with secrecy and confidentiality In mind, public networks are untrusted networks. To protect an internal network, a special network application or device is usually used to connect the internal network to a public network. This special network application is often called a security gateway or a firewall, and the purpose of a such network application is to prevent unauthorised access to the internal network. Typically there is need to restrict access to an internal network from a public network and/or to restrict access from the internal network to the public network or further networks connected to the public network.

In addition to security gateways and firewalls there is a plurality of other network security applications. For example, in intrusion detection systems (IDS) the traffic (data packets) flowing in a network is monitored and analysed in order to detect malicious or unauthorized actions in the network. Virtual private network (VPN) applications are used for connecting trusted parties to each other over untrusted public network through a secure tunnel. All traffic from a first party to a second party is encrypted by a VPN application of the first party, sent in encrypted form over the public network to the second party, where a VPN application decrypts the transmitted data and forwards the decrypted data to the recipient. The VPN is typically transparent to the processes that are communicating between each other and the encryption and decryption depend on the configuration of the VPN applications.

However, the above described network security applications cannot keep an effective security by themselves. The network security applications need to be carefully installed and configured, and the security policy needs to be evaluated and updated regularly, if the security application includes such security policy (e.g. VPN applications may not include a security policy). The contemporary development towards very complicated networks that need to have multiple user interfaces with the Internet for VPN (Virtual Private Network), the remote access, the e-business, the cache servers, etc. has increased the demands for administrative skills. Moreover, the surrounding network environment is fast changing and the updates need to be done in real time, detected flaws in the configuration and failures in the network security application operation need to be fixed as soon as possible in order to maintain required security level, connectivity and service availability. Also, the needs of the users may change over time and user information may need to be added or removed or modified.

Because the human factor plays a key role in failures of network security applications and security policies, it is important for a network security application and a system of network security applications to be easily administrable. Network security applications are often managed by a remote (fixed network) management system using a network connection and secured (encrypted) communication. The network security applications communicates with the management system, sending performance statistics, status information, alarms, and log data, while receiving policy updates and configuration changes. The management system may be part of the network security application or it may be a separate process, and a plurality of network security applications may be managed using one management system. Typically, there is a management user interface, via which the applications are managed. The management user interface may be remotely connected to the management system and/or the network security application.

The term network security application is used in this description for referring to any network security application or to a cluster of any network security applications, which are managed via a management user interface. The management user interface may be separate from the application itself or part of the application. A network security application may be, for example, a firewall node, a firewall node provided with Virtual Private Network (VPN) functionality, a network monitoring node, a virus scanning application or an IDS node.

FIG. 1 illustrates an example network topology with a first internal network 102, a second internal network 104 and Internet 100. The internal networks 102, 104 are connected to the Internet 100 via firewalls 108 and 108, respectively. Additionally, there is an IDS device 110 connected to the internal network 104.

The IDS device 110 monitors the data packets entering and exiting the internal network 104. Any of the network devices 106, 108, 110 may be implemented as one network node or as a cluster of network nodes. Then, there is a management user interface in computer 112 connected to the internal network 104. If internal networks 104 and 102 belong to the same organisation, all network devices 106, 108, 110 may be managed and configured using this management user interface 112, however typically there would be separate management user interfaces for the IDS device and firewalls. The actual management system may reside in the computer 112 and act as a central management system for the two firewalls, for example. Alternatively, the management system may be integral part of the firewalls.

Typically the management user interface and a central management system are in a fixed computer or work station connected to an internal network (or a plurality of such computers or work stations) and the connection between the management user interface and the network security applications Is a fixed connection. The reason for this is security (accessing the management system only from a physically secure location) and the fact that the management application is a complex application and running it for example over a conventional modem connection might be very slow. On the other hand, this means that this fixed computer or work station needs to be physically accessed in order to manage the managed applications. Thus, in order to react to information provided by the network security applications the management user interface needs to be monitored. The management system is commonly arranged to generate an alarm message, for example on a computer screen of a management user interface, as a response to predetermined (suspicious/malicious) actions or failures and therefore the output of the network security applications does not need to be analysed constantly. However, finding and fixing the conditions causing the alarm to go off requires human intervention, and therefore the alarms generated by the network security applications need to be monitored, by system administrators.

The network security applications are commonly arranged to send alarms for example to a predetermined pager device or as an SMS (Short Message Service) message to a predetermined mobile phone. Such pager device or mobile phone is typically carried with some administrator of the network security applications in order to receive the alarms instantly without somebody having to sit by the management user interface at all times. However, the alarm is only a short message indicating that something is wrong and the administrator receiving the alarm may not be even close to the management system or user interface, and therefore processing the alarm still needs the administrator to get to the management user interface in order to find out the reason for the alarm and to fix the situation.

It would be beneficial for the administrator to be able to fix the problem right away when receiving the alarm and therefore to be able to manage the network security applications in a more flexible manner and to respond to failures more rapidly.

SUMMARY OF THE INVENTION

An object of the invention is to provide a flexible method for managing network security applications, which avoids or alleviates the above mentioned problems. The object is achieved according to the invention with an arrangement disclosed in the attached independent claim. Preferred embodiments of the invention are disclosed in the dependent claims. The features described in one dependent claim may be further combined with features described in another dependent claim to produce further embodiments of the invention.

The idea of the invention is to provide for managing a network security application a limited management user Interface in addition to the management user interface known in prior art.

According to the invention there is provided an arrangement for managing a network security application comprising:

a full management user interface for conducting management operations for the network security application, and a limited management user interface for conducting a limited number of management operations of the full management user interface for the network security application over a wireless remote connection.

Further there is provided a network security application managed via a full management user interface, which comprises mechanisms for conducting management operations for the network security application, wherein the network security application is arranged to be managed also via a limited management user interface comprising mechanisms:

for conducting limited number of management operations of the full management user interface for the network security application over a wireless remote connection.

The invention provides means for managing network security applications irrespective of the physical location of the person conducting management operations. For example, a network security application administrator has a possibility to flexibly update configuration of a firewall with a mobile terminal without having to access the full (usually fixed network) management user interface. The actions requiring timely response may be generated by the application to be managed or by people using the application. The application may fail, a hostile intrusion may be detected or somebody may have legitimate problems in accessing some service or network and may require changing the access rights.

In addition, the limited management user interface enables an administrator to temporarily delegate rights to conduct some operation. For example, the administrator may be on holiday, when something urgent needs to be done, and it is much more convenient for the administrator to be able to delegate necessary rights temporarily to someone else than to do the job himself/herself during holiday.

Still, the initial configuration of the network security applications is conducted by using the full management user interface, since initial configuration usually requires some background work and, considering timely response, is not as critical as fixing problems or security flaws in already configured and running network security applications. This way not all the functionality of the full management user interface needs to be transferred to the limited management user interface. The management operations, that are usually required to be done as timely response to an alarm or to a user request, are included in the limited management system. Usually, such operations do not require large amounts of data to be transmitted between the management user interface and the network security application and are therefore well-suited for being conducted over a wireless communication channel and by using a mobile terminal having limited capabilities in comparison to a general use computer. Thus, the limited management user interface provides possibility to fix minor problems or make modifications fast as only some of the full management user interface functionality is included.

In addition, using wireless communication channel for delivering alarms and critical fixes to problems reliability of maintenance is increased, since mobile networks have inbuilt high availability and fault tolerance of services for example in contrast to the Internet, which is known to fail to deliver messages every now and then. Therefore timely receipt of alarms and response to them is more reliable when mobile network is used than if public network was used.

These and other features of the invention, as well as the advantages offered thereby, are described hereinafter with reference to embodiments illustrated in the accompanying drawings.

DETAILED DESCRIPTION OF THE INVENTION

Figure 1:
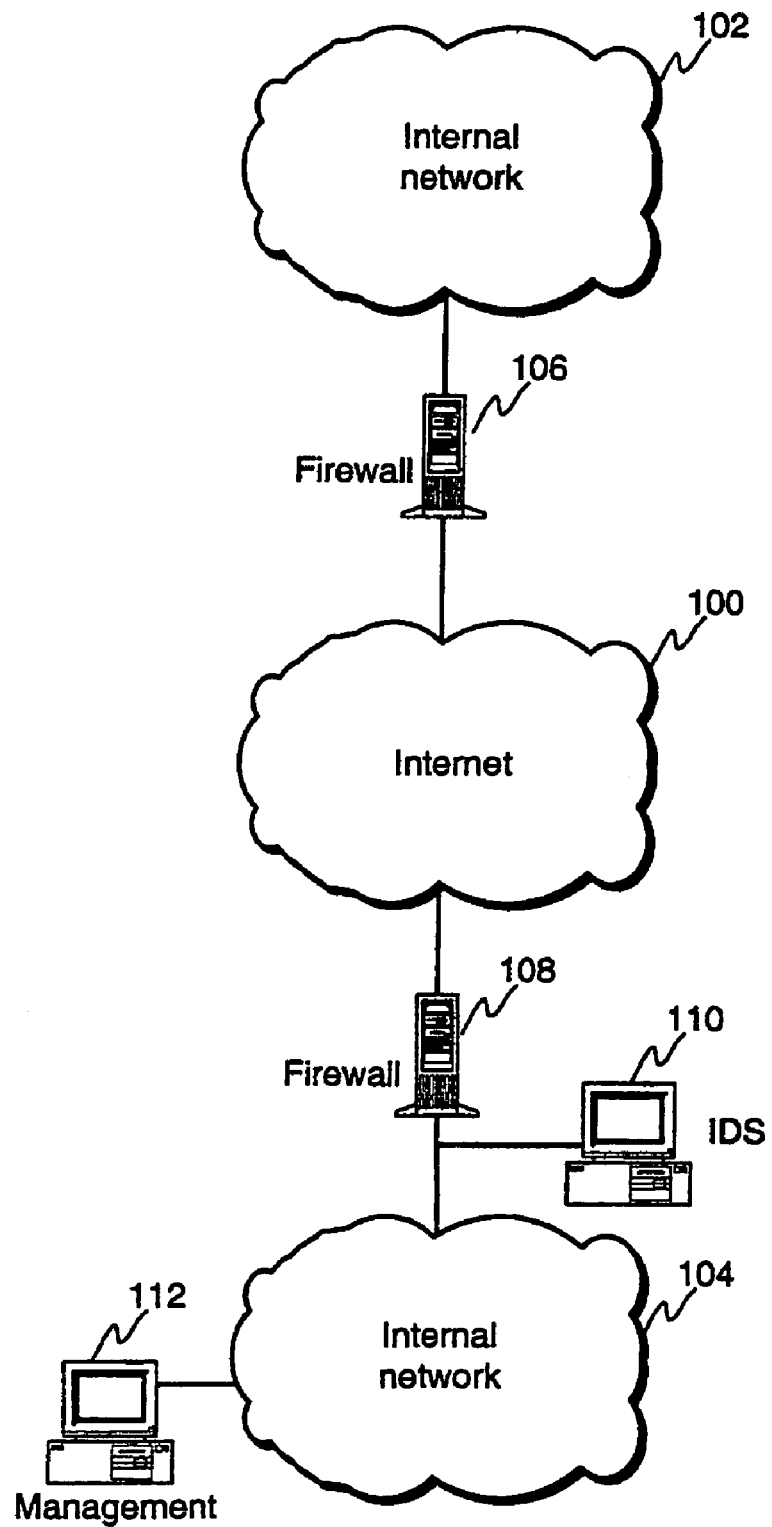
FIG. 1 illustrates an example network topology.

FIG. 1 is discussed in more detail above in connection with the prior art description.

Figure 2A:
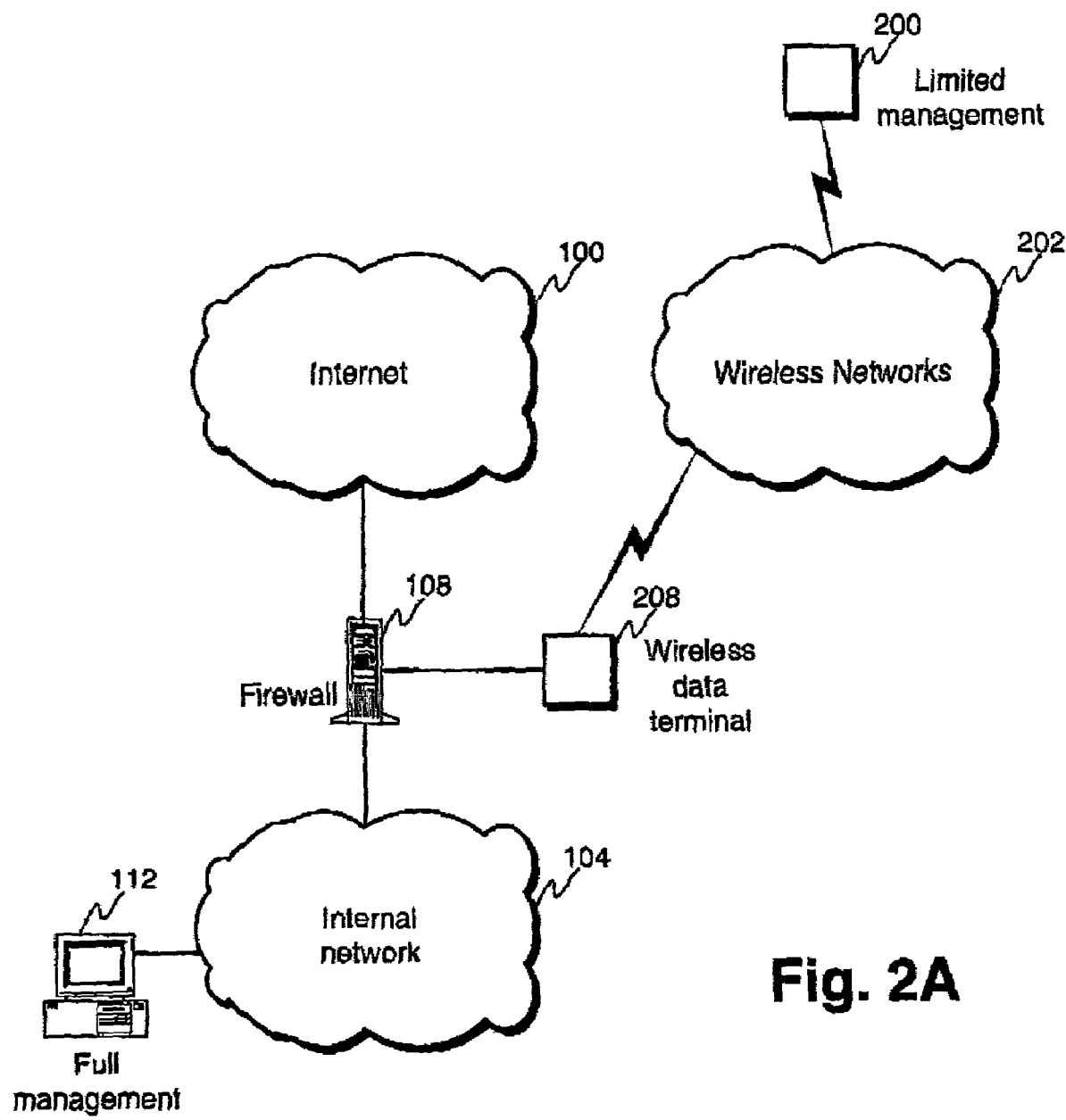
FIGS. 2A and 2B illustrate example network topologies according to the invention.

FIG. 2A illustrates an example network topology according to the invention. The second internal network 104 of FIG. 1 has a firewall 108 connecting it to the Internet 100. In the internal network there is connected a computer 112 with a full management user interface, using which the firewall 108 is managed. The management user interface in computer 112 is the full management user interface according to the invention and is connected to the firewall by means of a fixed data connection.

The limited management user interface according to the invention is provided by means of a wireless device 200, which is connected to a wireless network 202, which may be any wireless communication network, such as GSM (Global System for Mobile communications), CDMA (Code-Division Multiple Access), US-TDMA (Time-Division Multiple Access), GPRS (General Packet Radio Service), WLAN (Wireless Local Area Network) or UMTS (Universal Mobile Telecommunications System) network. The wireless device 200 may be for example a general purpose mobile phone or a PDA (Personal Digital Assistant) or any future coming mobile terminal. Connected to the firewall 108, there is a wireless data device 208, the wireless data device 208 providing the connection from the firewall 108 to the wireless network 202. The wireless data device may be for example a general purpose mobile phone or just a black box containing functionality for sending and receiving data over air interface and for communicating data to and from the firewall.

Figure 2B:
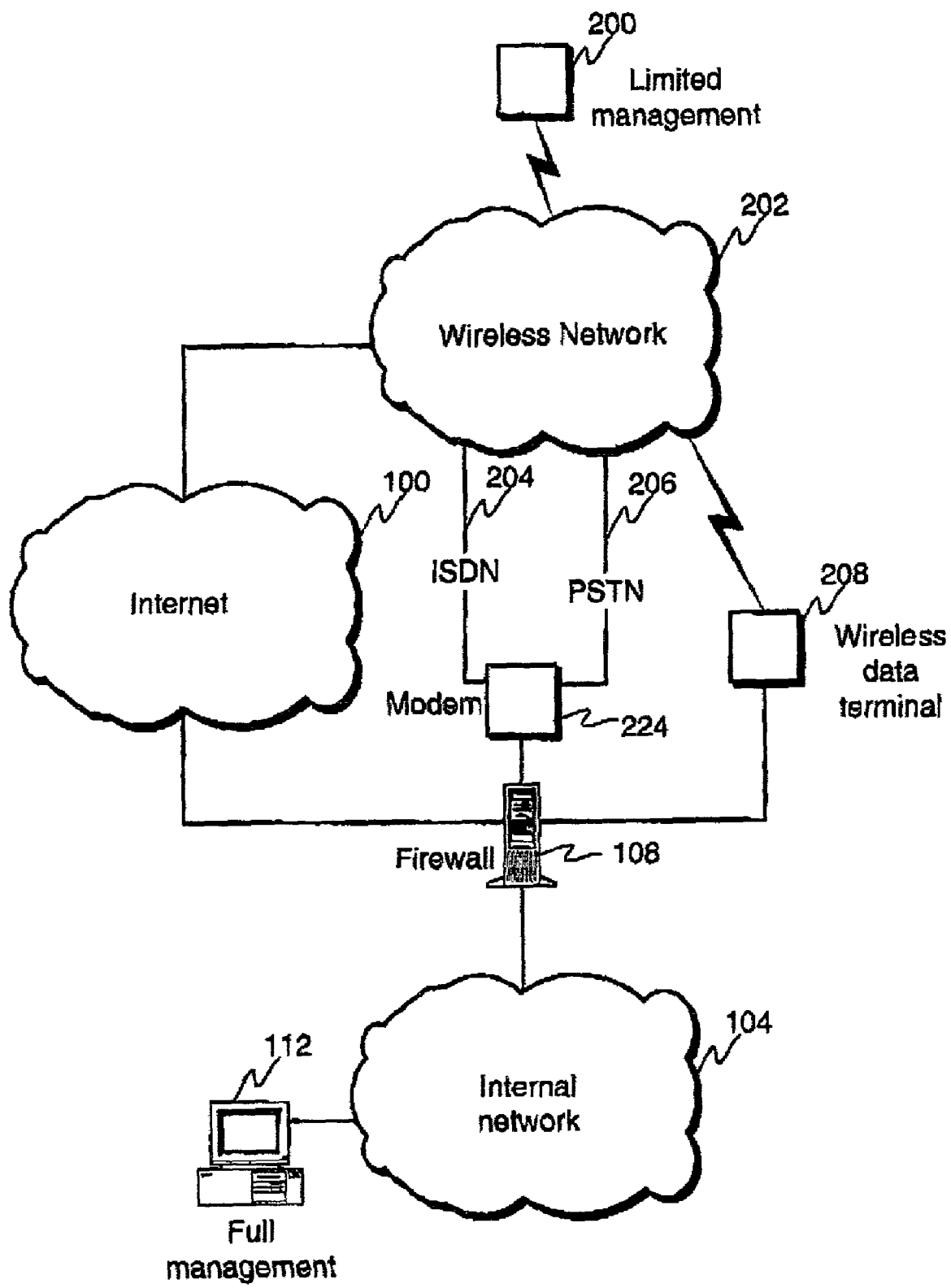

FIG. 2B illustrates another example network topology according to the invention, where the scenario shown in FIG. 2A is illustrated with some alternative paths to connect the firewall to the wireless device 200 providing the limited management user interface are presented. These alternative paths include: connecting the wireless device 200 to the firewall 108 via the wireless network 202 and further via Internet 100, an ISDN (Integrated Services Digital Network) line 204 and modem 224 or a PSTN (Public Switched Telephone Network) line 206 and modem 224, while the Internet, ISDN line and PSTN line provide connection from the firewall 108 to the wireless network 202. These paths from the firewall to the wireless network are presented here as examples only and there may be also some other suitable way to connect the firewall to the wireless network. Additionally, only one of the presented connections is sufficient for providing the connection between the wireless device 200 and the firewall 108. Furthermore, the firewall 108 may be connected to some other networks as well, but these are not shown here for the sake of clarity.

Figure 3:
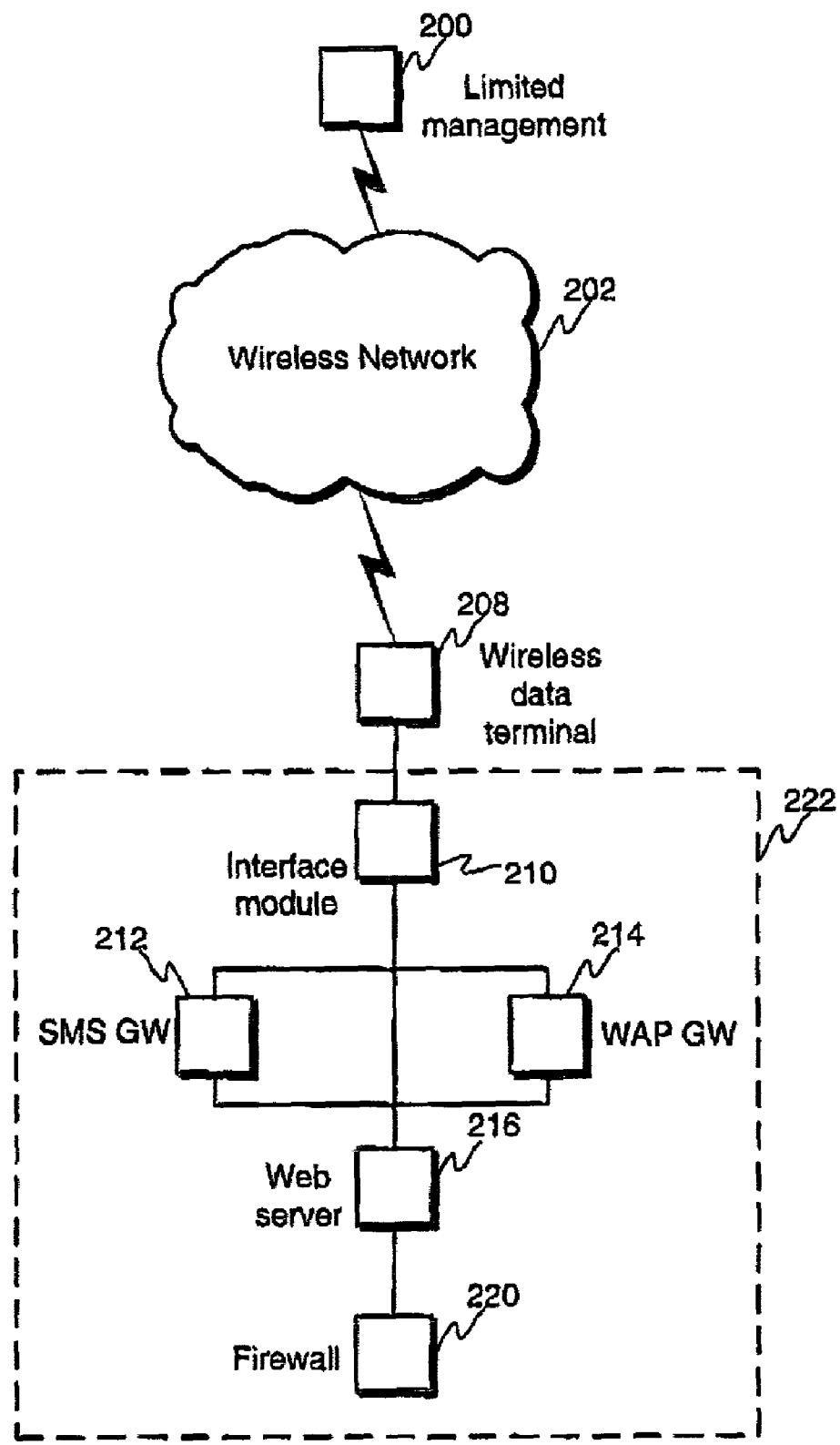
FIG. 3 illustrates still other example network topology according to the invention.

FIG. 3 illustrates a more detailed presentation of an example arrangement according to the invention. A firewall application 222 is connected to the wireless device 200 providing the limited management user interface via the wireless data device 208 and wireless network 202 in a similar manner to FIGS. 2A and 2B. One possible implementation for the firewall application is shown within the block 222. The firewall module 220, which Is a module providing the actual firewall functionality, is connected to a Web server module 216, which is logically connected to an interface module 210 via a SMS Gateway (GW) module 212 or a WAP (Wireless Application Protocol) Gateway module 214. Another possibility is that the Web server module 216 is connected straight to the interface module 210. These elements 220, 216, 210, 212 and 214 can be implemented as one application running in one computer or other suitable device or every module (or some of the modules) may be implemented as separate applications and may be run in separate devices as well. The interface module 210 is further connected to the wireless device 200 in the same way as shown and discussed in connection with FIG. 2A.

In the following, the modules of the firewall application 222 in FIG. 3 are discussed further.

The purpose of the interface module 210 is to establish connection between the wireless data device 208 and the firewall module 220. The connection between the wireless data device 208 and the interface module may be for example by serial cable (RS-232). Thus, the interface module 210 receives data received and forwarded by the wireless data device 208. The interface module includes functionality for identifying the incoming traffic so that it can forward data according to WAP protocol to WAP GW, SMS data to SMS GW and HTTP (HyperText Transfer Protocol) data straight to the Web server module 216.

In order to send an SMS message to the limited management user interface in the wireless device 200 the SMS GW composes AT commands for commanding the wireless data device via the interface module 210. (AT commands are well known commands for controlling modems.) These commands are only forwarded to the wireless data device by the interface module.

Main purpose of the WAP GW 214 is to transfer data between different protocols, that is, to adapt WAP and HTTP protocol stacks to each other. In other words, the WAP GW includes modules for transferring WAP content from the wireless data device to HTTP content for the Web server module and for transferring HTTP content from the Web server module to WAP content for the wireless data device. However, the WAP GW is not needed if the Web server module understands WAP protocols and WML (Wireless Markup Language) used in WAP.

Similarly, the main purpose of the SMS GW 212 is to transform data from the web server module to a format suitable for an SMS connection and vice versa.

The Web server module provides WAP and HTTP content to the wireless data device via interface module and SMS or WAP GW. The Web server module may communicate with the firewall module 220 by using cgi-bin queries. Alternatively, there may be a dedicated application protocol between the firewall module and the Web server module.

Since correct operation of network security applications is critical to any organization, security in managing such applications over wireless interface according to the invention is an important issue. Since the device may be general purpose mobile terminal, which is used for other purposes as well, it is possible that also somebody else than the legitimate administrator of the network security application has access to the device. Therefore, it must be verified that the device sending the management commands is legitimate and that the user of the device is legitimate. To achieve this, the network security application may comprise mechanisms for authenticating the wireless device used for limited management and the person using said wireless device in the messages received from the limited management user interface to the network security application.

This can be done for example by allowing configuring which wireless devices may be used for limited management only via the full management user interface. Also the operations included in the limited management user interface may be configured via the full management user interface. In other words, the full management user interface may comprise management operations for configuring the limited management user interface. Further, it may be required, that a response to an alarm comes from the same device where it was sent to, that is, the wireless device is authenticated by using subscriber number. Alternatively or additionally, it is possible to restrict the use of the limited management user interface only to responding to messages from the network security application by attaching into each message an authentication code to be replied in the response from the limited management user interface and ignoring in the network security application all messages not including a valid authentication code. In addition, the persons sending the messages need to authenticate themselves in each message, for example by means of a pin (personal identification number) code, a Secur ID-card or by using a SIM (Subscriber Identification Module) card with encryption capabilities, such as PKI (Public Key Infrastructure) SIM, which uses asymmetric encryption (key pair of public and private key).

The management operations included in the limited management user interface may include receiving and acknowledging alerts. Sending alerts to a wireless device as a response to a predefined situation is known already in prior art, but there has not been the possibility to acknowledge the alerts, therefore the alert may have been sent to a plurality of recipients or a plurality of times to each recipient in order to verify receipt of the alert. With the arrangement according to the invention flooding the recipients with unnecessary alerts is prevented. Therefore, the limited management user interface comprises management operations for acknowledging receipt of an alarm, that is, received alarms are acknowledged via the limited management user interface and after the acknowledgement the firewall "knows" that the alarm has been received. Legitimacy of the acknowledgement may be verified by including in the acknowledgement message an acknowledgement code obtained from the respective alert for binding together the alarm and the acknowledgement and for example a pin code identifying the person sending the acknowledgement. Also more secure authentication may be used for some management operations. For example PKI SIM may be used.

The network security applications usually generate and store log data in order to provide users an audit trail of the actions taken and things that have happened. Log data can be used for finding problems or detecting security flaws, etc. In order to find a reason for an alarm, the administrator of the network security application needs to explore the log data. According to the invention it is possible to view the log data fully via the full management user interface and in addition to view limited amount of the log data via the limited management user interface. As the amount of log data is often massive, it is not reasonable to provide all possible information via the limited management user interface. On contrary, the log data is filtered in order to find out the entries that are useful for solving a particular problem. For example, the entries generated during certain period of time or entries concerning particular service or particular user may be filtered out and shown via the limited management user interface. The limited management user interface may comprise a management action in which the administrator (or the user of the limited management user interface) may specify, how the log data is to be filtered, or the data may be filtered automatically on the basis of the details of a related alarm.

In order to facilitate management operations via the limited management user interface there is the capability to configure via the full management user interface scripts for most common command or request combinations to be run via the limited management user interface. This way it is possible to run complex command strings in the network security application with a small amount of user commands via the limited management user interface. The user may need to give some parameters for running the scripts, though.

In general, the full management user interface comprises full scale of management operations for setting initial configuration of the network security application and for updating or modifying configuration of the network security application, and the limited management user interface comprises management operations for updating or modifying configuration of the network security application, but not for setting initial configuration of the network security application.

The network security application according to the invention may be implemented as a suitable combination of hardware and software. Typically the implementation is software program code executed in a processor unit combined with suitable memory resources. The limited management user interface may be provided in the wireless device for example by means of a dedicated application or via a general purpose browser, such as a web browser or a micro browser.

It must be appreciated that the invention is above described in connection with a firewall application by way of example only. The network security application to be managed according to the invention may clearly be any other network security application that requires constant maintenance.

It will be apparent for those skilled in the art that the illustrative embodiments described are only examples and that various modifications can be made within the scope of the invention as defined in the appended claims.

The invention claimed is:

1. Network management equipment comprising:
a wireless communication device, and
a firewall device connectable between a first data network and a second data network,
   said firewall device further comprising a network security application of the firewall device monitoring traffic passing through the firewall device between said first data network and said second data network,
   said firewall device further comprising a full management user interface which comprises mechanisms for conducting management operations for said network security application of said firewall device over a secure data connection, from a full management station managing a plurality of firewall devices and
   said firewall device further comprising a wireless communication interface module connected directly to said firewall and wirelessly connected to a remote wireless communication device and configured to provide, via said remote wireless communication device, a limited management user interface for conducting a limited number of management operations of said full management user interface for the network security without accessing said full management station.

2. Equipment according to claim 1, wherein,
said full management user interface comprises management operations for setting initial configuration of the network security application of said firewall device and for updating or modifying configuration of the network security application of said firewall device, and
said limited management user interface comprises management operations for updating or modifying configuration of the network security application of said firewall device.

3. Equipment according to claim 1, wherein,
the network security application of said firewall device comprises mechanisms for sending to the limited management user interface an alarm as a response to a predefined situation, and
said limited management user interface comprises management operation for acknowledging receipt of an alarm.

4. Equipment according to claim 1, wherein,
the network security application comprises memory and mechanisms for storing log data into the memory,
said full management user interface comprises management operations for viewing said log data, and
said limited management user interface comprises management operations for viewing limited amounts of said log data.

5. Equipment according to claim 1, wherein said wireless remote connection uses wireless application protocol (WAP).

6. Equipment according to claim 1, wherein said wireless remote connection uses short message service (SMS) messages.

7. Equipment according to claim 1, wherein said wireless remote connection uses HyperText Transfer Protocol (HTTP).

8. Equipment according to claim 1, wherein,
the limited management user interface resides in a wireless device and the network security application comprises mechanisms for authenticating said wireless device and mechanisms for authenticating the person using said wireless device in the messages received from the limited management user interface to the network security application.

9. Equipment according to claim 1, wherein,
said full management user interface comprises management operations for configuring said limited management user interface.

10. Network management equipment comprising:
a remote wireless device configured to transmit and receive data wirelessly to implement a limited management interface for a network security firewall application of a firewall device;
a firewall device configured to be connectable between a first data network and a second data network, and
a computer managing a plurality of firewall devices and coupled to said firewall device and programmed to provide a full management user interface which comprises mechanisms for conducting management operations for a network security firewall application of said firewall device over a secure data connection, and
a wireless data terminal which communicates wirelessly with a remote wireless device and directly connected to said firewall device,
and wherein said firewall device comprises
a network security firewall application comprising:
a firewall module that controls said firewall device to monitor traffic passing through said firewall device between said first data network and said second data network, and
a wireless communication interface module directly coupled to said wireless data terminal and configured to provide data from wireless communications with said remote wireless device to said firewall module so as to provide the ability for said remote wireless device to directly control said firewall device so as to provide a limited management user interface for conducting a limited number of management operations of said full management user interface using said network security firewall application without accessing said computer managing said plurality of firewalls.

* * * * *